Figure 1:
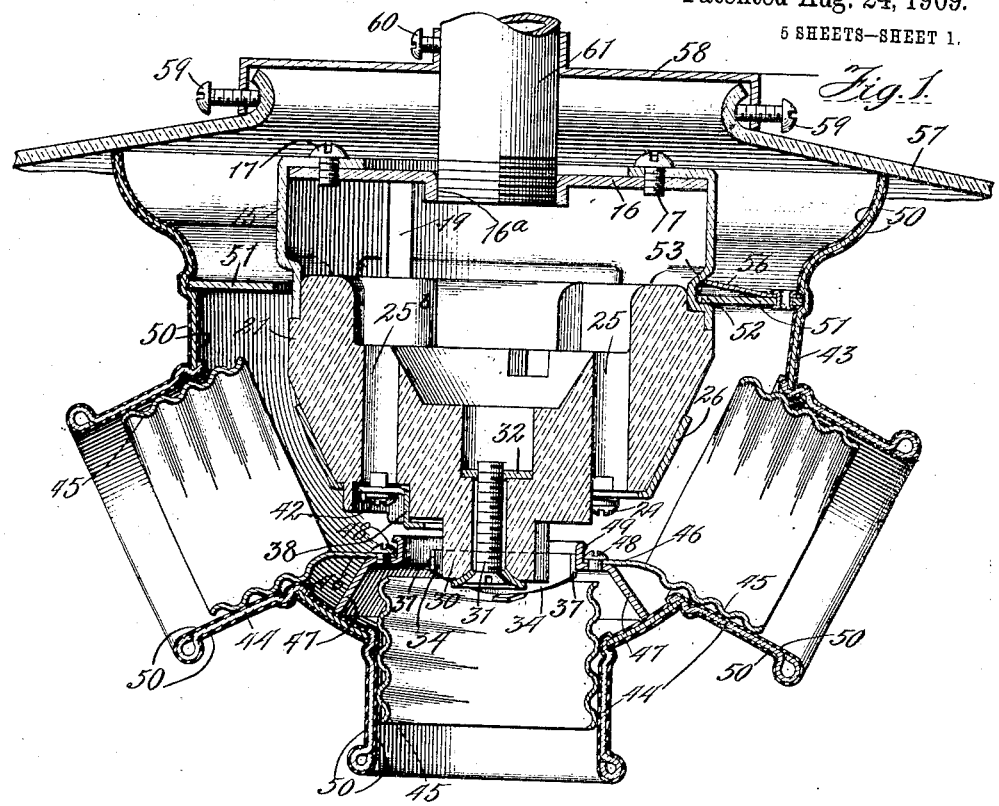

R. B. BENJAMIN.
CLUSTER LAMP SOCKET.
APPLICATION FILED JULY 18, 1907.

931,722.

Patented Aug. 24, 1909.
5 SHEETS—SHEET 1.

Witnesses:
Ba D. Perry
C. L. Hopkins

Inventor:
Reuben B. Benjamin,
By Jones, Addington & Ames,
Attys.

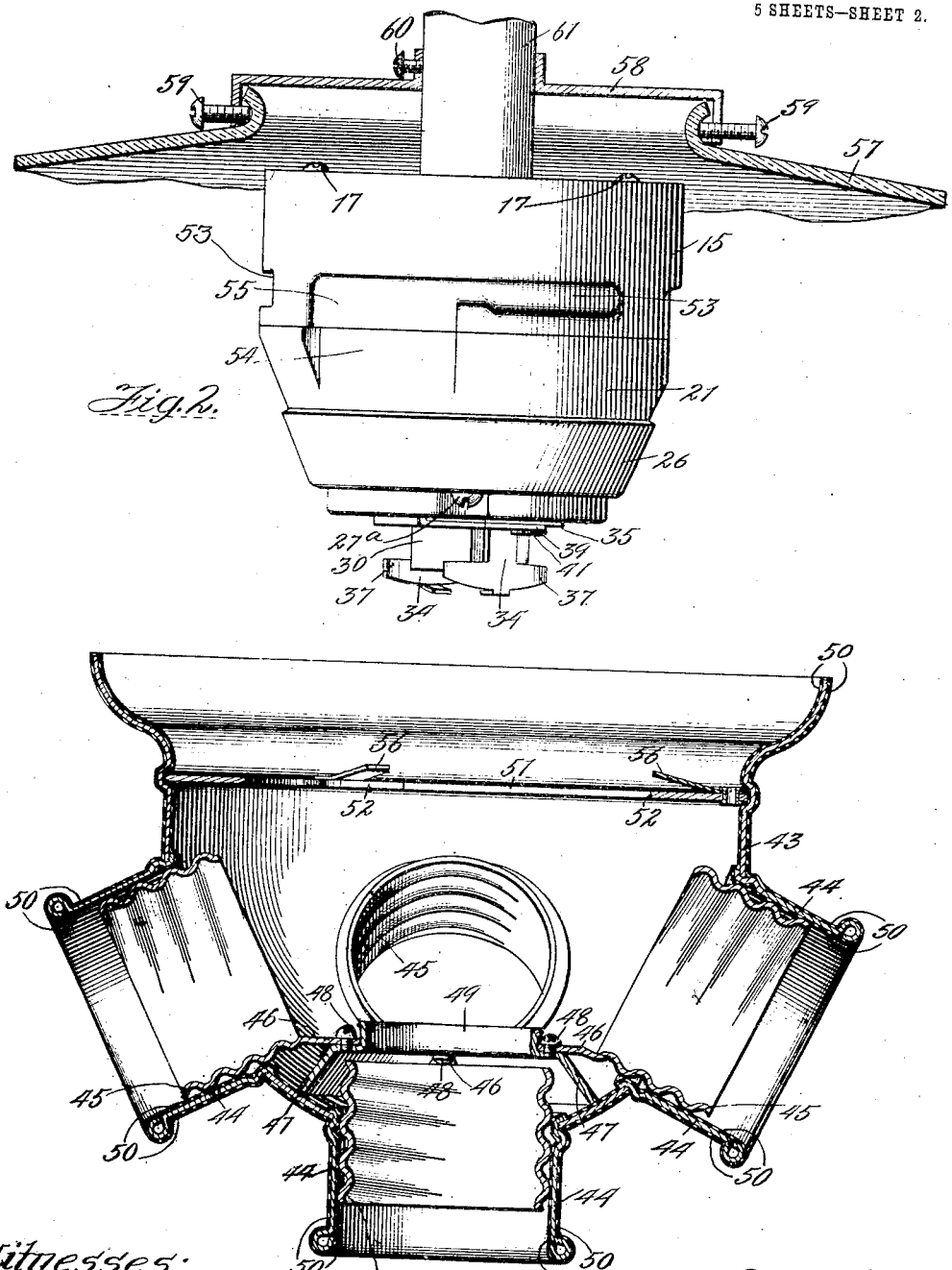

R. B. BENJAMIN.
CLUSTER LAMP SOCKET.
APPLICATION FILED JULY 18, 1907.

931,722.

Patented Aug. 24, 1909.
5 SHEETS—SHEET 3.

Witnesses:
Za P. Perry
C. L. Hopkins

Inventor:
Reuben B. Benjamin,
By Jones, Addington & Ames,
Atty.

R. B. BENJAMIN.
CLUSTER LAMP SOCKET.
APPLICATION FILED JULY 18, 1907.

931,722.

Patented Aug. 24, 1909.
5 SHEETS—SHEET 4.

Witnesses:
Ira D. Perry
C. L. Hopkins

Inventor.
Reuben B. Benjamin
By Jones, Addington & Ames.
Attys.

R. B. BENJAMIN.
CLUSTER LAMP SOCKET.
APPLICATION FILED JULY 18, 1907.
931,722.
Patented Aug. 24, 1909.
5 SHEETS—SHEET 5.
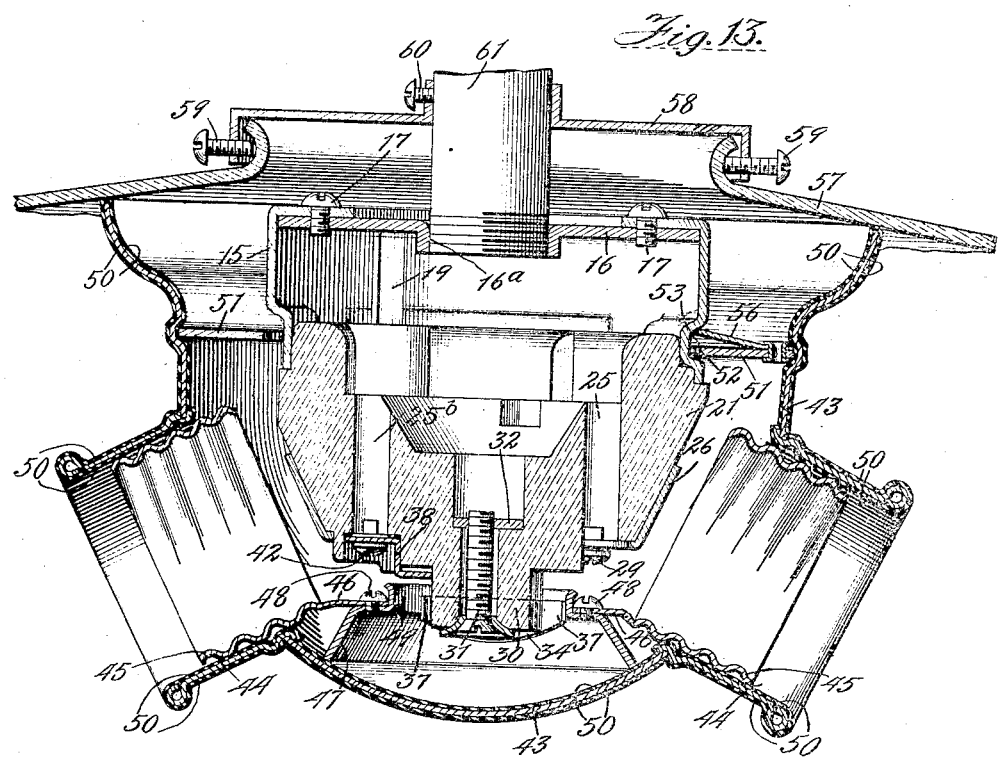
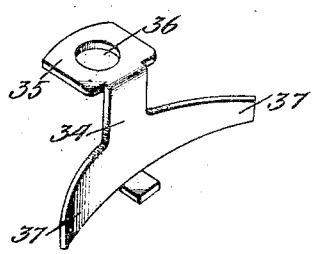
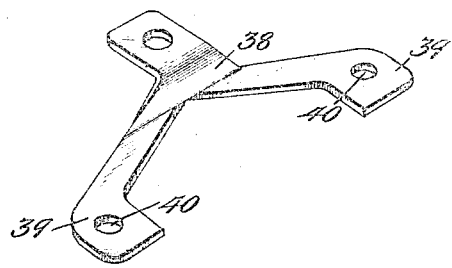
Witnesses:
Inventor:
Reuben B. Benjamin,
By Jones, Addington & Ames,
Attys.

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

CLUSTER LAMP-SOCKET.

931,722.

Specification of Letters Patent.   Patented Aug. 24, 1909.

Application filed July 18, 1907.   Serial No. 384,309.

*To all whom it may concern:*

Be it known that I, REUBEN B. BENJAMIN, a citizen of the United States, residing at Chicago, in the county of Cook and State of Illinois, have invented new and useful Improvements in Cluster Lamp-Sockets, of which the following is a full, clear, concise, and exact description, reference being had to the accompanying drawing, forming a part of this specification.

This invention relates to improvements in cluster lamp sockets, the general object of the invention being the improvement of devices of this class.

More particularly, one of the objects of my invention is to provide a plural lamp-holding device in which the body portion of the structure, carrying the lamps, may readily be connected with or disconnected from that portion of the device in which connection is made with the leading-in conductors or supply wires. In devices of this class as commonly constructed, it is necessary when the outer body portion of the device is to be removed for any reason, as, for instance, for the removal of a shade, to disconnect the leading-in wires from their binding-posts. By the use of my invention this objectionable feature is obviated, as the body of the device and the lamps carried thereby may be readily detached and removed without disturbing the electrical connections, and when this body portion is replaced electrical and mechanical connection are made at the same time and by the same manual operation.

Another object of the present invention is the provision of a device of this class in which the danger of a shock being imparted to a person coming in contact with the outer casing of the device is eliminated.

Another object of the invention is to provide such a device in which the number of lamps which the device will carry may be readily changed at any time without disturbing the electrical connections or detaching from its support the part of the device which carries the conducting plates, or removing the same from its position. This, and such other objects as may hereinafter appear, are accomplished in the embodiment of my invention herein described, and shown in the accompanying drawings.

Figure 10:
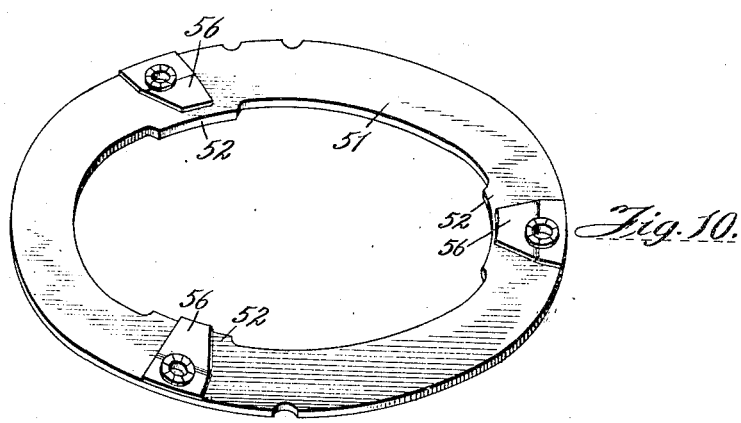
Figure 3:
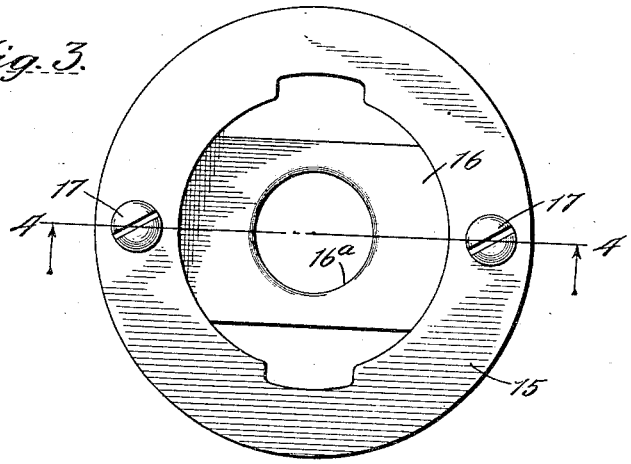
Figure 6:
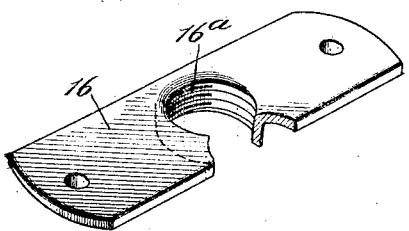
Figure 4:
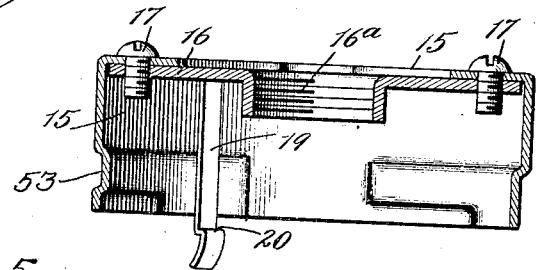
Figure 5:
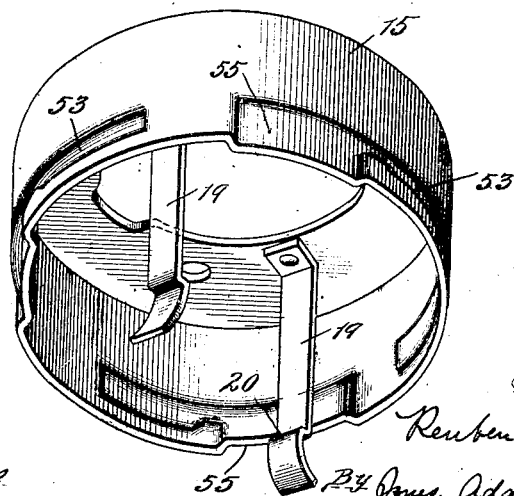
Figure 7:
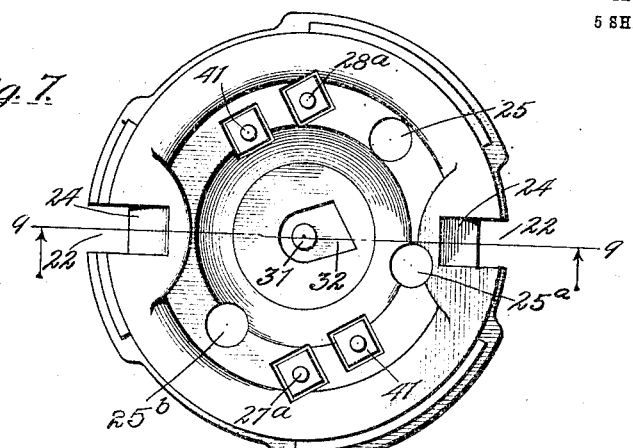
Figure 9:
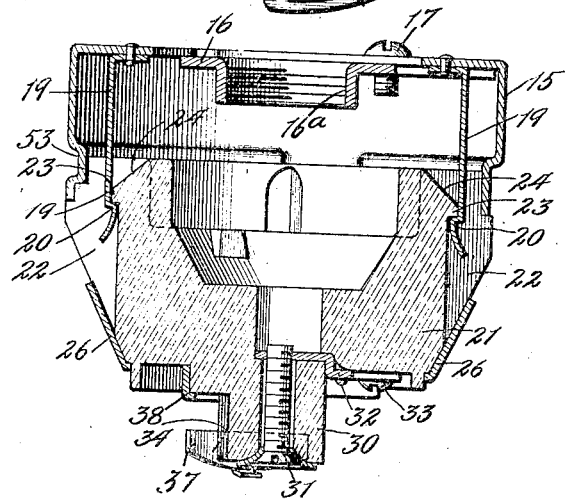
Figure 8:
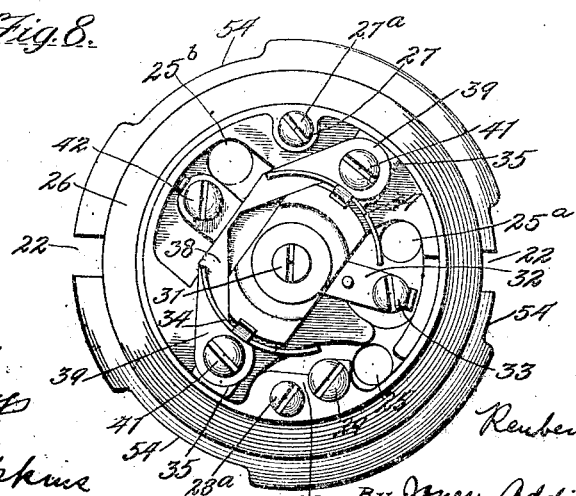

In these drawings Figure 1 is a central vertical sectional view of a device embodying my invention; Fig. 2 is a view, partly in section and partly in elevation, of the device with the lamp-carrying portion thereof separated from the supporting portion; Fig. 3 is a top plan view of the supporting cap of the device; Fig. 4 is a cross-sectional view of this cap, the section being taken on the line 4—4 of Fig. 3; Fig. 5 is a perspective view of this cap; Fig. 6 is a broken perspective view of a screw-threaded plate which is secured to the supporting cap and is adapted to be carried upon the lower end of a depending pipe or similar conduit; Fig. 7 is a top plan view of an insulating base which carries the various contact plates and binding-screws of the device; Fig. 8 is a bottom plan view of this insulating base and the parts carried thereby; Fig. 9 is a central vertical section of the insulating base and the supporting cap, this section being taken on the line 9—9 of Fig. 7; Fig. 10 is a perspective view of a supporting ring which is secured to the lamp-carrying portion of the device and makes mechanical connection with the supporting cap; Figs. 11 and 12 are perspective views of conducting plates; and Fig. 13 is a sectional view similar to Fig. 1, but showing a form of the device in which the socket for the center depending lamp is omitted.

In the several figures of the drawings, in which like reference numerals indicate the same parts throughout, 15 is a supporting cap. This cap 15 is given the form of an inverted cup, and is provided with a central opening for the passage therethrough of leading-in wires. This opening may be spanned by a plate 16 (shown detached in Fig. 6) which is secured in place on the cap by screws 17, 17. This supporting plate 16 is formed with a screw-threaded opening 16ᵃ and is employed when the device is to be carried upon the lower end of a depending pipe, but may be dispensed with when the device is to be secured directly to a ceiling or wall. In the latter case the screws 17 will serve to thus secure the device in place. The cap 15 is provided with a pair of depending resilient fingers 19, 19, these fingers being provided with hooked ends 20 adapted to engage and sustain an insulating base 21, formed of porcelain or the like. This base 21 is provided with a pair of grooves 22, 22 formed in the sides thereof at two opposite points for the accommodation of the spring fingers 19. In these grooves shoulders 23, 23 are provided which rest upon the hooks 20 of the fingers 19, whereby the base is sustained and secured to the supporting cap 15. To facilitate the insertion of the base into the cap and the passage of the fingers into their corresponding grooves, these grooves are inclined at 24 and the lower end of each of the spring fingers 19 is bent outwardly, as clearly shown in Figs. 4, 5 and 9.

The base 21 is provided with three openings, 25, 25$^a$ and 25$^b$ respectively, through which the leading-in wires are led to the contact plates which are carried upon the lower side of this base. The base 21 has the general contour of a truncated cone. A ring contact plate 26 extends around the inclined sides of the base and forms the center contact for each of a series of lamps which are disposed in a circle about the base, as will be explained hereinafter. This plate 26 is provided with a pair of inturned wings or lugs, 27 and 28 respectively, and is secured to the base by a pair of bolts, 27$^a$ and 28$^a$ respectively, which pass through the base and these wings, and are provided with nuts on their upper ends. The wire which leads to this plate 26 will be brought down through the opening 25 and will be secured to a binding-screw 29 with which the wing 28 is provided.

The base is formed with a downwardly projecting lug 30 through which extends a screw 31 forming the center contact for the center lamp of the device. The upper end of this screw takes into a plate 32 which extends to the exterior of the base through a suitable opening and is provided with a binding-screw 33. The wire leading to this binding screw 33 will be brought down through the opening 25$^a$ in the base.

Upon each side of the lug 30 is disposed a plate 34 (shown detached in perspective in Fig. 11). These plates are each provided with an end 35 which is bent at a right angle with the main body portion of the plate and is perforated at 36 for the passage of a screw therethrough. The opposite end of the plate 34 is formed with a pair of laterally-extending wings 37, 37, these wings being curved to approximately the form of a circle having its center at the center of the bolt 31. When the lamp-carrying or body portion of the device is put up into place, these plates 34 engage a contact plate carried by said lamp-carrying portion as hereinafter described, making electrical connection therewith and conducting current to one terminal of each of the lamps.

A Y-shaped plate 38 (shown detached in Fig. 12) is secured to the under side of the base with its legs 39 extending toward and overlying the ends 35 of the plates 34. The legs 39 are perforated at 40 and through these perforations and the perforations in the plates 34 extend bolts 41, these bolts securing the plates 34 and 38 to the base in electrical contact with each other. The conductor which leads to this plate 38 is brought down through the opening 25$^b$ in the base and is secured to a binding-screw 42 carried by the plate 38.

The portion of the device which carries the lamps comprises a generally bowl-shaped casing 43 formed with a series of lamp-receiving openings arranged in a circle therearound, and, in some cases, with a centrally-disposed opening in line with the axis of the device. Surrounding each of these lamp-receiving openings is a collar or sleeve 44 into which is inserted a threaded lamp-receiving shell 45. Each of the threaded shells 45 is provided with a tongue 46, these tongues leading to and being secured to a centrally disposed ring 47 by means of small screws 48. This ring 47 is formed with flaring sides and is disposed in the casing with its larger portion resting upon the bottom of the casing. The upper edge of this ring is contracted to form a neck 49, adapted to receive the lower ends of the plates 34, 34 when the casing is put up into place. By this means electrical connection is automatically made between the current-carrying plates 34, 34 and the outer ring contact of each of the lamp-receiving sockets. When the lamps are screwed into the sockets the center contact of each of these lamps, except the center, depending lamp, will engage the dished ring 26. The center contact for the center lamp is formed by the bolt 31, as hereinbefore explained. As this bolt 31 is screwed into the plate 32 which has its own binding-screw 33, the center lamp may, by the use of suitable switching means, be lighted or extinguished independently of the lamps that are arranged in the circle. If it be desired to dispense with this feature of separate control a wire may be connected across the binding-screws 33 and 29, thus connecting in multiple the center contacts for all the lamps.

The outer casing 43 is provided, both exteriorly and interiorly, with a coating 50 of fictile material, such as enamel, to completely insulate the same. One of the advantages of this method of insulating the casing is that the necessity of providing fiber shells or the like between the lamp-receiving socket shells and the casing is overcome and the danger of short circuiting by the loose ends of wires coming in contact with the casing is eliminated. The enamel will preferably be white so as to reflect light. This material is easily cleaned and presents a good appearance. All danger of shocks from coming in contact with the casing is obviated, as, even though the insulation be broken at some point on the interior of the casing and a conducting part be in contact with the metal of the casing at such point, the casing, being exteriorly insulated, cannot impart a shock to a person touching the same.

The casing and the lamps carried thereby are sustained in place on the supporting cap 15 by means of a bayonet joint device which comprises an annular plate 51 (shown detached in Fig. 10) provided with inwardly-projecting lugs 52, and corresponding depressions 53 in the supporting cap 15. These depressions 53 are preferably three in number and are formed by indenting the sheet metal of the cap 15. The base 21 is formed with grooves 54 coinciding with similar grooves 55 formed in the cap 15 and leading into the depressions 53. The annular plate 51 is secured in the casing 43 near the upper portion thereof, and is so disposed in said casing that when the latter is put up into place the lugs 52 on the plate 51 will pass up through the grooves 54 and 55, whereupon the casing is given a rotation in a horizontal plane, causing these lugs to pass around into the depressions 53. To retain the parts in position by preventing backward rotation, and consequent detachment of the casing from the supporting cap, there is provided upon each of the lugs 52 a leaf spring 56, these leaf springs bearing upon the upper edges of the depressions 53 and tending to force the plate 51 downward. The depressions 53 are made wider at their inner ends to permit the plate to drop slightly and the lugs 52 to occupy this widened portion.

It will be seen that by means of the invention herein described I have provided a cluster lamp socket in which, by the mere placing of the outer casing in position and the imparting thereto of a slight rotation, mechanical connection is made between this casing and its support, and, at the same time, electrical connection is made between the various lamp sockets carried by the device and the parts to which the leading-in wires of the device are electrically connected.

If, at any time, it be desired to change the number of lamps carried by the device, this may be readily done by simply turning the outer casing slightly in a left-hand direction, whereupon this casing may be removed and another casing having a greater or lesser number of lamp sockets may be substituted therefor without the necessity of making any changes whatever in the electrical connections and without removing the base of the device from its support.

Where it is desired to use a shade with this device such shade may be readily put in place or removed without disturbing the electrical connections. The base 21 and supporting cap 15 are of sufficiently small diameter to permit the ordinary commercial shade to be passed up or down over these parts without the removal of such parts from their support. The shade 57 may rest upon the upper edge of the casing 43, and will be held in place by the usual shade-holder comprising a plate 58 having downturned edges provided with screws 59 for engaging the shade and a screw 60 adapted to engage the pipe 61 which forms the conduit through which the wires are brought.

In Fig. 13 I have shown a form of the device in which the central, axially-disposed lamp is dispensed with. In this case the center lamp-receiving shell 45 is omitted, and, if desired, the screw 31 and plate 32 may also be omitted.

What I claim as new and desire to secure by Letters Patent is:

1. A plural lamp-holding device comprising, in combination, a supporting member, a housing, lamp-receiving sockets carried by said housing, detachable connection between said supporting member and said housing, a plate electrically connected with a plurality of said sockets, an insulating base detachably carried by said supporting member, and a contact member carried by said base and disposed to engage said plate when said housing is secured to said supporting member.

2. A plural lamp-holding device comprising, in combination, a supporting member, a casing, lamp-holding sockets carried by said casing, detachable connection between said supporting member and said casing, a contact member electrically connected with a plurality of said sockets, an insulating base removably secured to said supporting member, and a second contact member carried by said base and disposed to engage said first-named contact member when said casing is secured to said supporting member.

3. A plural lamp-holding device comprising, in combination, a supporting member, an insulated casing, lamp-holding devices carried by said casing, detachable connection between said supporting member and said casing, a contact member electrically connected with one of the terminals of each of a plurality of said lamp-holding devices, an insulating base carried by said supporting member, and a second contact member carried by said base and disposed to engage said first-named contact member when said casing is secured to said supporting member.

4. A plural lamp-holding device comprising, in combination, a supporting member, an insulating base carried by said supporting member, a casing also carried by said supporting member, said base and casing being independently detachable from said supporting member, a contact member carried by said base, a contact member carried by said casing and disposed for engagement with said first-named contact member, and a plurality of lamp-holding devices carried by said casing and insulated from each other by said casing, said lamp-holding devices having each a contact electrically connected to said last-named contact member.

5. A plural lamp-holding device comprising, in combination, a supporting member, an insulating base carried thereby, a contact plate surrounding said base and provided with a binding-screw, a second contact plate also provided with a binding-screw and carried by said base, said base being provided with openings for the passage therethrough of conductors to said binding-screws, a casing removably secured to said supporting member and provided with a plurality of lamp-receiving openings so disposed that each of the lamps arranged therein will engage with one of its terminals said first-named contact plate, and means whereby, when said casing is secured to said supporting member, said second-named contact plate is electrically connected with the other terminal of each of the lamps.

6. A plural lamp-holding device comprising, in combination, a supporting member, a lamp-carrying member, a series of radially-disposed sockets carried by said lamp-carrying member, a single socket centrally disposed relatively to said series of sockets, means for detachably securing said lamp-carrying member to said supporting member, an insulating base detachably secured to said supporting member independently of said lamp-carrying member, a contact plate carried by said lamp-carrying member and electrically connected with all of said sockets and disposed axially with said centrally-disposed socket, and a contact plate located upon said base and adapted to engage said first-named plate when said lamp-carrying member is secured to said supporting member.

7. A plural lamp-holding device comprising, in combination, a supporting member, a lamp-carrying member, a series of radially-disposed sockets carried by said lamp-carrying member, a single socket axially disposed relatively to said series of sockets, means for detachably securing said lamp-carrying member to said supporting member, an insulating base carried by said supporting member independently of said lamp-carrying member, a contact plate electrically connected with all of said sockets, and a second contact plate located upon said base and adapted to engage said first-named contact plate when said lamp-carrying member is secured to said supporting member.

8. A plural lamp-holding device comprising, in combination, a supporting member, a lamp-carrying member, a series of radially-arranged sockets carried by said lamp-carrying member, a single socket axially disposed relatively to said series of sockets, an insulating base, a contact member on said base arranged to form the center contact for each of said radially-disposed sockets, a separate center contact member for said axially-disposed socket, means for connecting supply conductors with each of said center contact members, a contact plate carried by said lamp-carrying member and electrically connected with all of said sockets and another contact plate located upon said base and disposed to engage said first-named contact plate when said lamp-carrying member is secured to said supporting member.

9. A plural lamp-holding device comprising, in combination, a supporting member, a lamp-carrying member, a series of radially-disposed sockets carried by and insulated from each other by said lamp-carrying member, a single socket disposed radially with relation to said series of sockets, an insulating base, a center contact member for said single socket, a common center contact member for said series of sockets, another contact member on said base, and means whereby, when said lamp-carrying member is secured to said supporting member, electrical connection is automatically made between all of said sockets and said last-named contact member.

10. The combination of a supporting cap, a shade having an opening through which said cap may pass, a base carried by said cap and having binding terminals thereon, a body arranged to carry the lamps, means for securing said body to said cap independently of said base after the conductors have been secured to the binding terminals, and means for making electrical connection between said binding terminals and the lamps when said body is secured in position.

11. The combination of a supporting member, a shade having an opening through which said supporting member may pass, a base capable of being passed through said shade, binding terminals on said base, a body arranged to carry the lamps and adapted to be secured to said supporting member after the conductors have been connected to said binding terminals, and means for electrically connecting said binding terminals with the lamps when said body portion is secured in position.

12. The combination with a shade, of a cap capable of being passed through said shade, a base supported by said cap and also capable of being passed through said shade, binding terminals on said base, a body arranged to carry the lamps, readily detachable means for securing said body to said cap, and means for electrically connecting said binding terminals with the lamps when said body is in position.

13. The combination of a cup-shaped cap, a base insertible therein, binding terminals on said base, a body arranged to carry the lamps, readily detachable means for securing said body to the exterior of said cap, and coöperating means carried by said base and body for making electrical connection between said binding terminals and the lamps when said body is secured in place.

14. The combination of a supporting cap, a base carried thereby, a plurality of binding screws on said base, openings extending through said base for the passage therethrough of conductors to said binding screws, a shade adapted to have said base and supporting cap passed therethrough, a casing supporting and insulating a plurality of lamps, and means whereby, when said casing is secured to said supporting cap, electrical connection is automatically made between said binding screws and the terminals of the lamps carried by said casing.

15. The combination of a supporting cap and an insulating base inserted into said cap, means for detachably retaining said base in said cap, a body portion adapted to carry and insulate a plurality of lamps, said body portion being removably connected with said cap, and means for conducting current to each of the lamps carried by said body portion.

16. A plural lamp-holding device comprising, in combination, a supporting cap, a body portion arranged to carry the lamps and secured to said cap so as to be readily detachable therefrom, a base insertible into said cap, binding terminals on said base, and means for automatically establishing electrical communication between said binding terminals and the lamps when said body portion is secured in position on said cap.

17. In a plural lamp-holding device, the combination with a bowl-shaped casing, of a ring mounted therein having a plurality of inwardly projecting lugs, a supporting cap having bayonet slots for the reception of said lugs, and means for preventing rotation and consequent disengagement of said lugs from said slots.

18. In a plural lamp-holding device, the combination with a bowl-shaped casing, of a ring mounted therein having a plurality of inwardly projecting lugs, a supporting cap having bayonet slots for the reception of said lugs, and spring tongues engaging the edges of the slots for preventing rotation and consequent disengagement of said lugs from said slots.

In witness whereof, I have hereunto subscribed my name in the presence of two witnesses.

REUBEN B. BENJAMIN.

Witnesses:
M. L. FARRAR,
O. L. HOPKINS.